United States Patent
Cameron

[15] 3,636,256
[45] Jan. 18, 1972

[54] CHART-READING APPARATUS

[72] Inventor: Eugene A. Cameron, Silver Spring, Md.
[73] Assignee: Instronics Limited, Ottawa, Canada
[22] Filed: Oct. 23, 1969
[21] Appl. No.: 868,835

[52] U.S. Cl. .................................................. 178/18, 346/31
[51] Int. Cl. ....................................................... G08b 21/00
[58] Field of Search ................ 178/18, 19, 20; 343/112 PT, 343/5 MM; 235/151, 151.11; 318/575, 576, 577; 346/31

[56] References Cited

UNITED STATES PATENTS

| | | | |
|---|---|---|---|
| 3,328,801 | 6/1967 | Boyle | 346/31 |
| 3,505,561 | 4/1970 | Ward et al. | 315/18 |
| 3,449,833 | 6/1969 | Dzula | 33/1 |
| 3,423,589 | 1/1969 | Bardwell et al. | 318/577 |
| 3,394,366 | 7/1968 | Dye | 315/18 |
| 3,271,564 | 9/1966 | Rosenfeld et al. | 235/151.32 |
| 2,983,858 | 5/1961 | Herndon | 235/151.11 |
| 2,499,178 | 2/1950 | Berry et al. | 318/577 |
| 3,440,638 | 4/1969 | Van Valkenberg | 315/18 |

Primary Examiner—Kathleen H. Claffy
Assistant Examiner—Tom D'Amico

[57] ABSTRACT

Chart-reading apparatus for providing the "X" and "Y" coordinates of selected points on a line as the line is traced by a manually movable index. A source of radiation located below a table top is moved by servo means to follow movement of the index, which index carries radiation-sensing means. The servo means operate "X" and "Y" encoders, and the operator by actuation of a "readout" switch selects those points for which the "X" and "Y" coordinates are to be provided as outputs.

10 Claims, 9 Drawing Figures

PATENTED JAN 18 1972

INVENTOR
EUGENE A. CAMERON

BY
Cushman, Darby & Cushman
ATTORNEYS

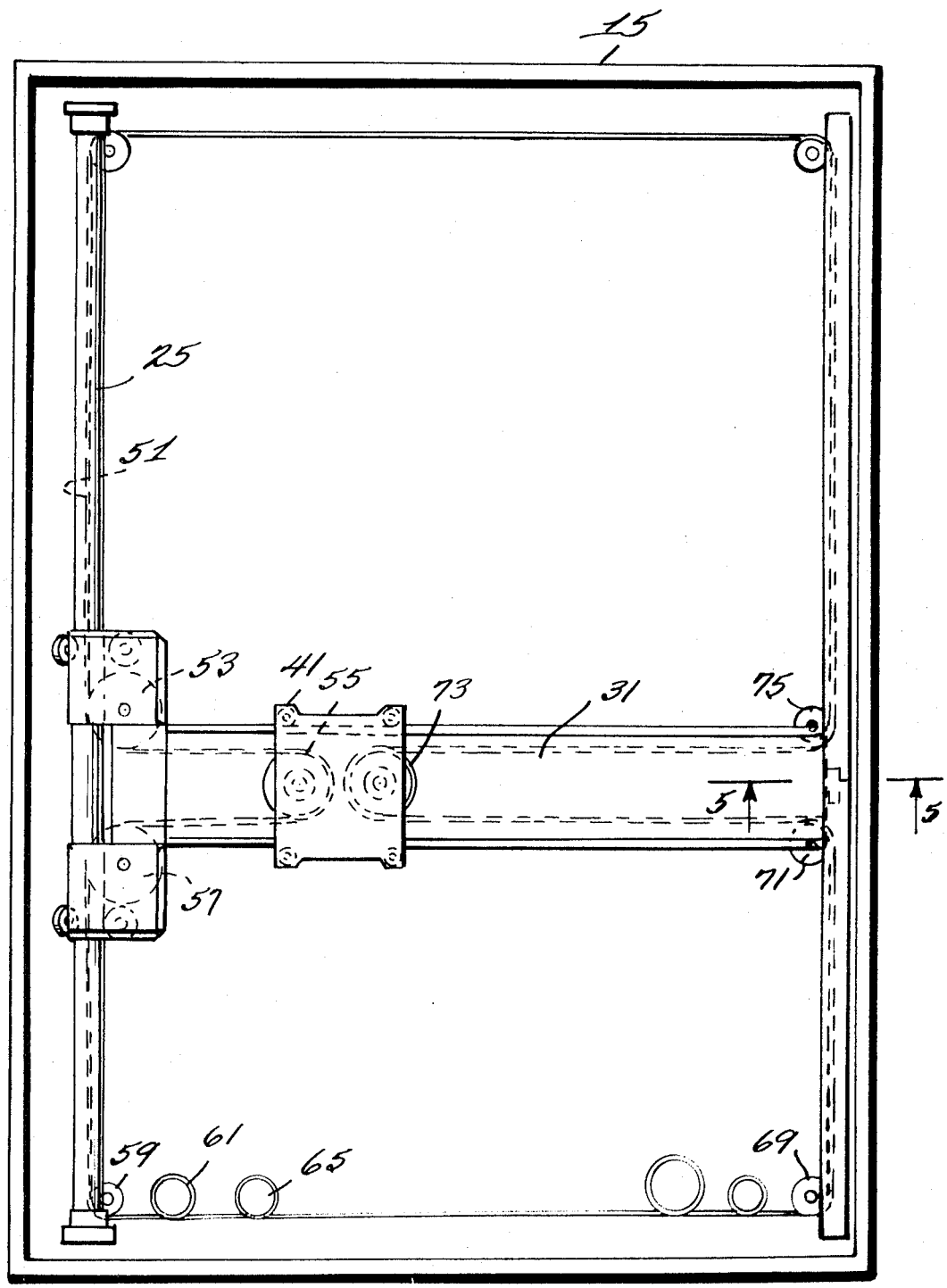

INVENTOR
EUGENE A. CAMERON

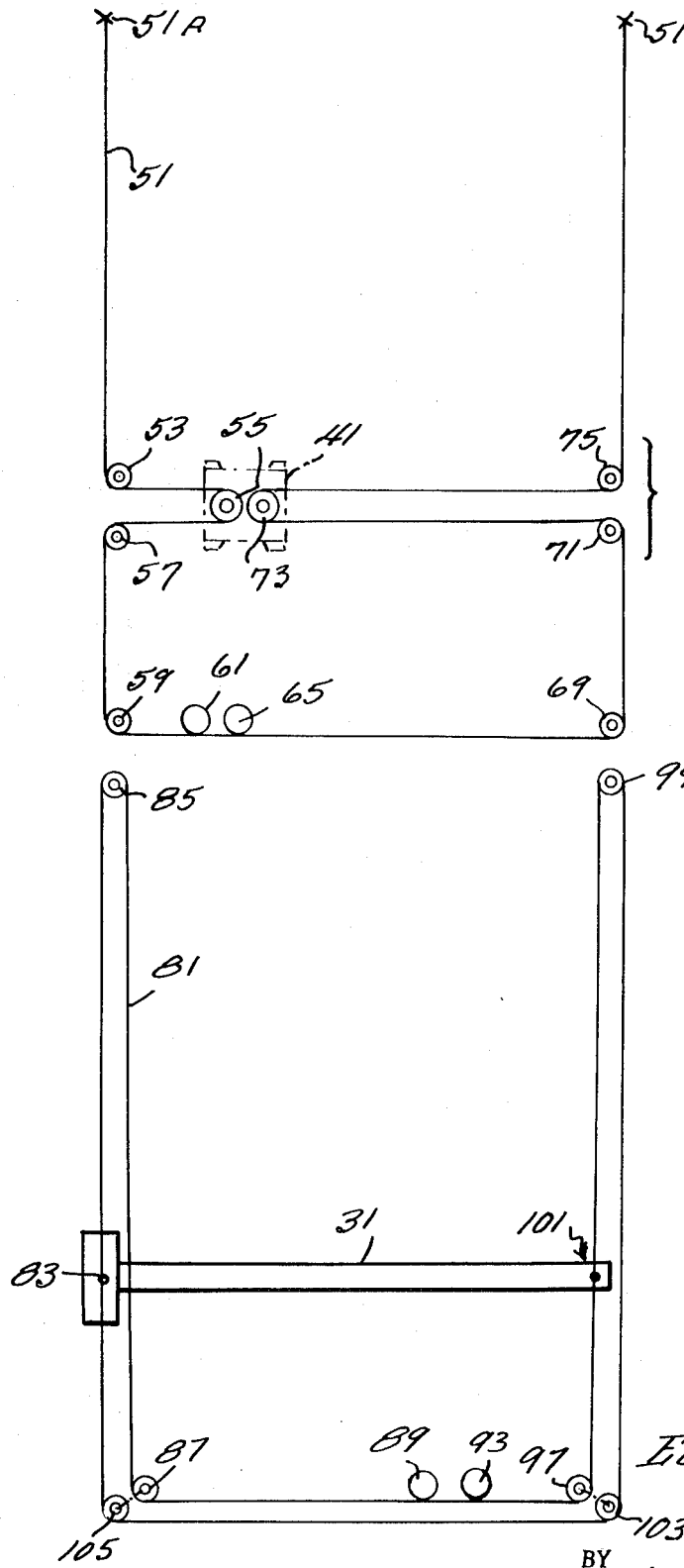

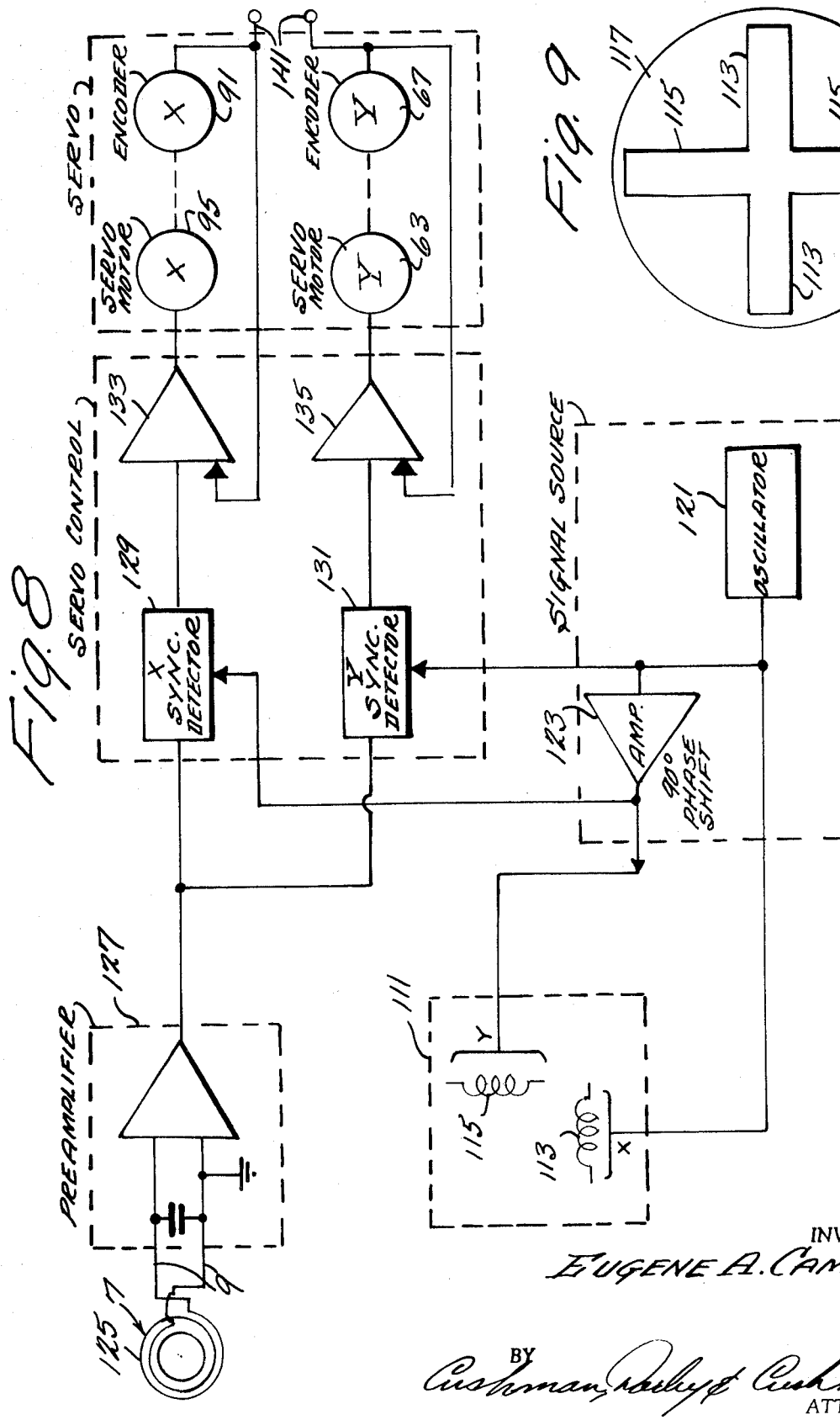
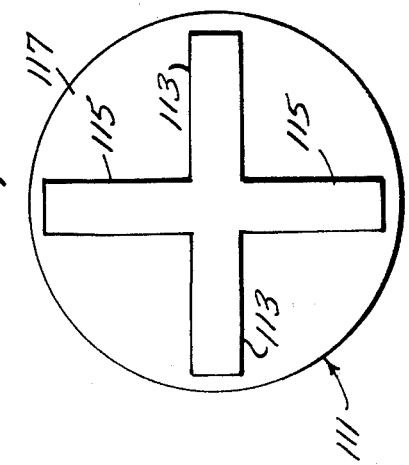
Fig. 8 (Servo Control)
Fig. 9

CHART-READING APPARATUS

DISCLOSURE

This invention relates to the reading and writing devices which find particular application to the tracing of drawings such as maps to provide numerical data indicative of the lines of the drawings which are traced.

With the development of digital devices in connection with the inputs and outputs of digital computers, the need has arisen for devices which will enable a curve on a map or a line on a drawing to be traced manually, and which will automatically supply the X- and Y-coordinates of the various points along the traced curve relative to some reference point and axis. Several devices which perform the function of curve followers are commercially available, and these can be divided into two main groups, namely, the mechanical group, which followers tend to be relatively cheap but are relatively inaccurate, and the electrical group which are relatively accurate but are relatively expensive.

An object of the present invention is the provision of a line follower which, while retaining the relative cheapness of mechanical line followers, performs with an accuracy at least approaching that of the more expensive electrical line followers.

According to the present invention, means adapted to provide the X- and Y-coordinates of selected points along a manually traced line, relative to a preselected origin and axis of reference, comprises: a planar table providing a support for a map or drawing the lines of which are to be traced; a source of radiation located below the said planar table but in close proximity to that table; a manually movable index disposed above the table; radiation detecting means affixed to the movable index and effective to receive radiation through the table from the radiation source; mounting means below the table carrying the source of radiation and permitting movement of that source below a limited area of the table; servo means arranged to receive an error signal from the radiation detecting means and to reposition the mounting means to correct any deviation of the positioning of the source from a position immediately opposite the radiation-detecting means; "X" axis encoding means operated by the servo means and providing an indication of any change in position of the source along a predetermined "X" axis on the table; "Y" axis encoding means operated by the servo means and providing an indication of any change in position of the source along a predetermined "Y" axis on the table, normal to the said "X" axis; and operator actuated readout means providing when actuated an output indicative of "X" and "Y" coordinates ascertained by the two encoding means.

The invention will now be described, by way of example, with reference to the accompanying drawings, in which:

FIG. 2 is a plan view of the working parts of a planar tabletop shown in FIG. 1;

Figure 5:
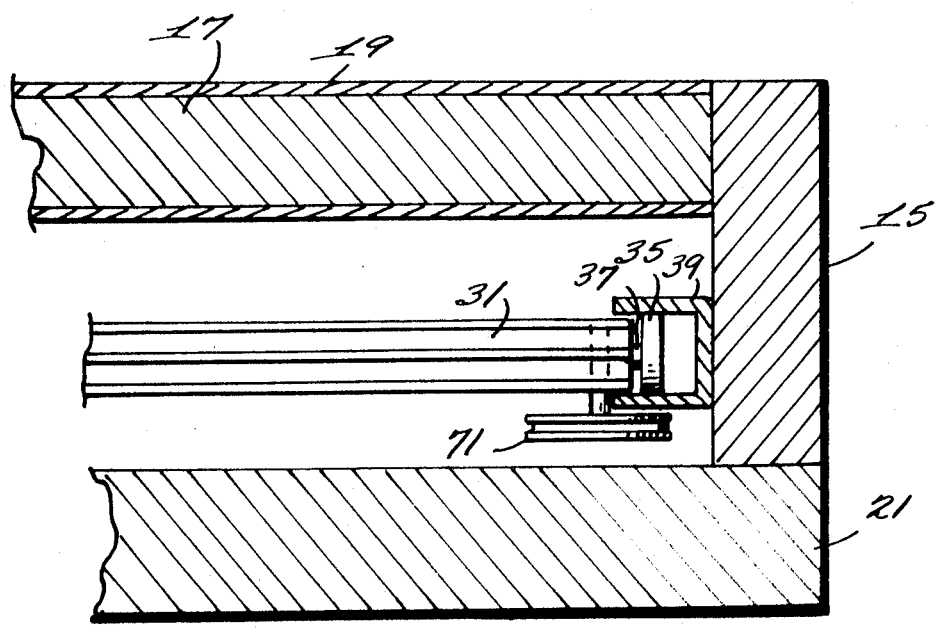
Figure 3:
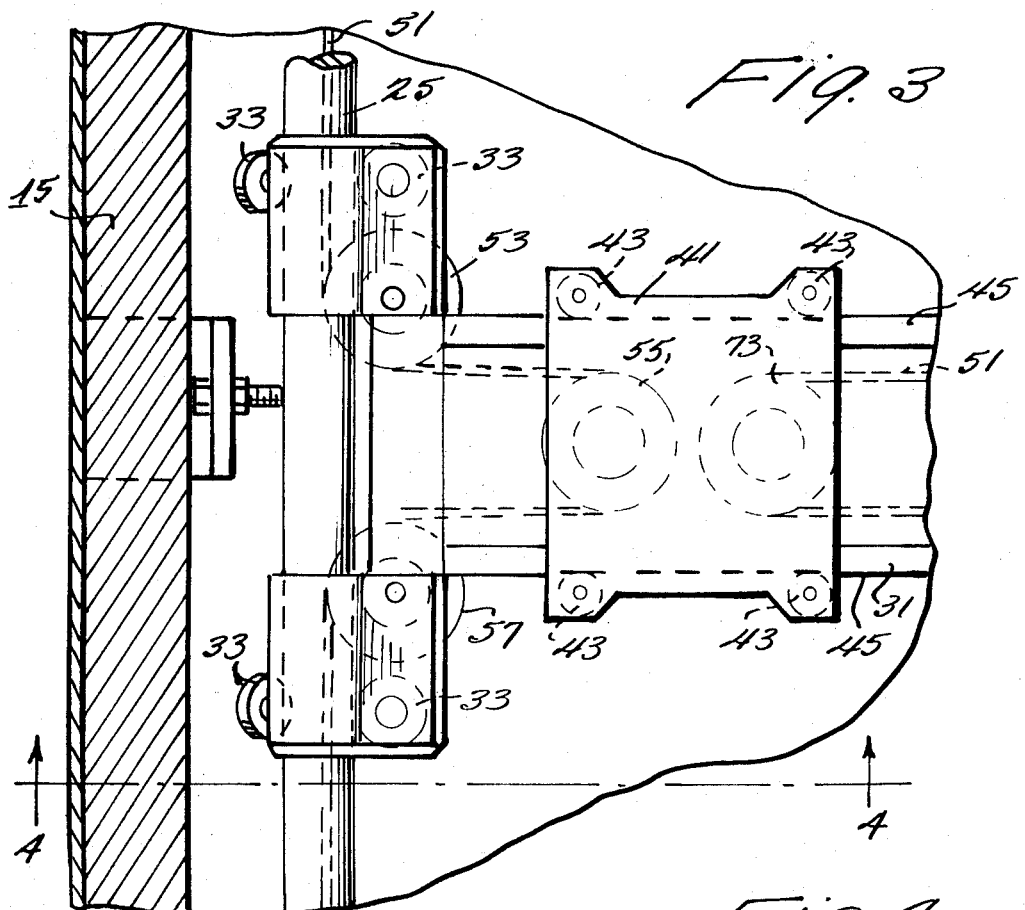
FIG. 3 is a plan view of a radiation-source-positioning means shown in FIG. 2, but is drawn to a larger scale than in FIG. 2.
Figure 4:
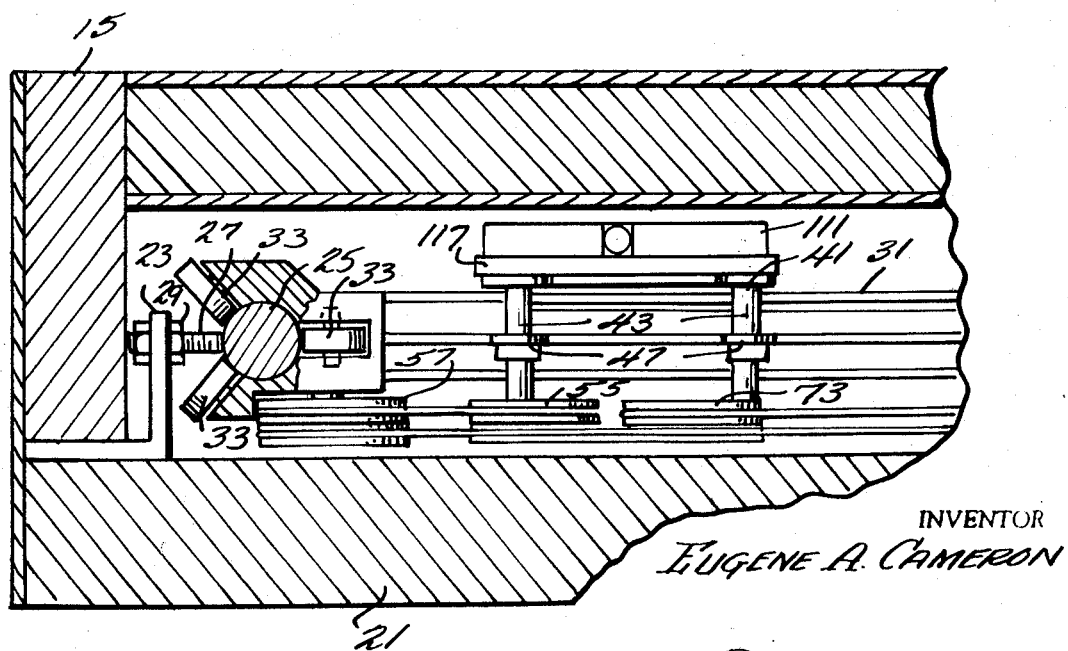
FIG. 4 is a sectional end elevation taken on the line IV—IV of FIG. 3.

FIG. 5 (which is located on the same sheet as is FIG. 1) is a sectional end elevation taken on the line V—V of FIG. 2;

FIG. 6 is a schematic representation of "Y" axis servo means and encoder means included in the tabletop;

FIG. 7 is a schematic representation of "X" axis servo means and encoder means included in the tabletop;

FIG. 8 is a schematic circuit diagram of servo means and encoder means included in the tabletop; and FIG. 9 is a diagrammatic representation of a radiation source shown in FIG. 8.

Figure 1:
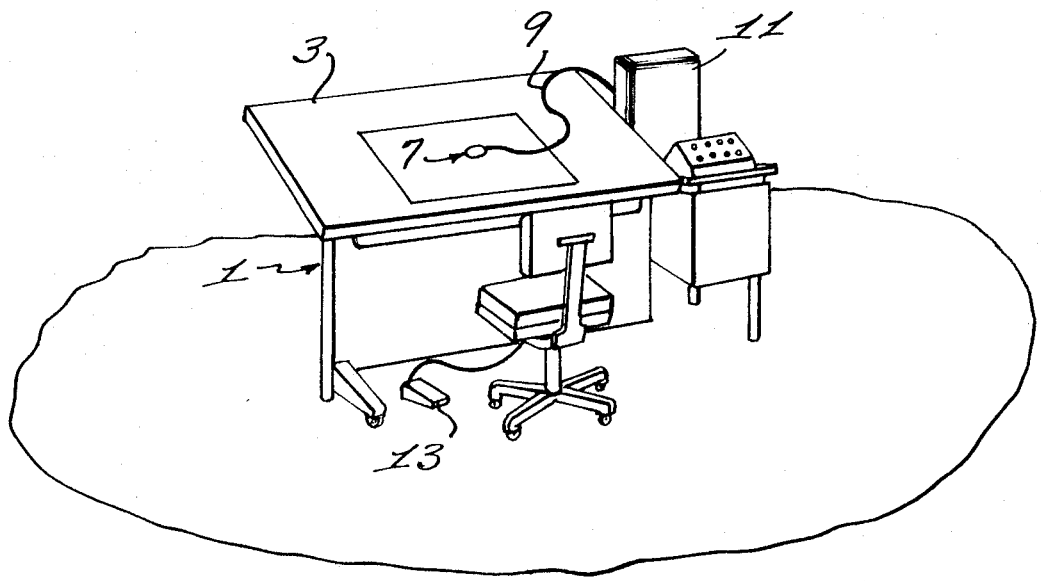
FIG. 1 is a pictorial view of a line-tracing device according to the present invention.

Referring first to FIG. 1, the apparatus comprises a stand 1 carrying a planar tabletop 3 on which a map 5 or other drawing to be traced can be placed. An operator stands or sits in front of the drawing, and moves over a desired line of the drawing a movable index 7 connected by a very light and flexible electrical lead 9 to associated electrical apparatus indicated generally at 11. When the operator desires the apparatus to readout the instantaneous X- and Y-coordinates of the point under the index, he operates a foot switch 13. Thus the operator is able to select those points at which he is satisfied that his index is properly positioned relative to the drawing. In the apparatus 11, a record is made of the coordinates of the selected points, and if desired these coordinates can be displayed, for example, by a five-digit "NIXIE" display for each of the X- and Y-axes.

FIGS. 2 to 5 illustrate the construction of the planar tabletop 3, which consists of a rigid rectangular frame 15 on which is mounted a top panel 17 formed of "Honeycomb" and "Formica" and provided with a suitable top finish layer 19. This top panel provides little hindrance to the passage of electromagnetic waves having a frequency of 3 kc., for example. The frame 15 is secured to a base board 21 which encloses the bottom of the tabletop 3. Brackets 23 mounted on the frame 15 support a rigid metal rod 25 through metal stud bolts 27 welded to that rod at spaced points along its length. These bolts 27 being screw-threaded and being provided with nuts 29 enable the rod 25 to be accurately trued up once in the tabletop. Slidably mounted on the rod 25 is an arm 31 which extends at right angles away from the rod, the arm carrying at each of two locations spaced-apart along the rod 25 a set of three rollers 33, which engage the rod and so provide rolling rather than sliding friction. The three rollers in each set are spaced at orientations of 120° round the rod 25 to provide proper support, and the mounting means for these rollers enable a fine adjustment of the radial positions to be made to ensure a completely shake-free movement of the arm 31 along the rod.

At its free end, the arm 31 carries a roller 35 mounted on a spindle 37, and this roller rests in a U-shaped track 39 conventionally mounted on the frame 15, and serves to locate the arm against up-and-down movement as illustrated in FIG. 5.

Mounted on the arm 31 is a slider 41 provided with four rollers 43 which, by engaging accurately machined side surfaces 45 on the arm position the slider laterally of the arm and which include flanges 47 (see FIG. 4) which locate the slider vertically on the arm. It will be seen that the slider 41 is thus accurately positioned on the arm 31 and that the arm 31 is accurately positioned in the rod 25.

FIGS. 6 and 7 illustrate how the slider 41 can be moved to any desired point under a limited area of the top panel 17. Referring first to FIG. 6, a flexible steel cable 51 is anchored at its ends 51A and 51B near the upper and lower right-hand corners of the tabletop. This cable is threaded as shown in FIG. 6 to extend around a pulley 53 mounted at the inward end of arm 31, around a first pulley 55 carried by the slider 41, around a further pulley 57 also mounted at the inner end of the arm 31, around a fixed pulley 59 mounted near the upper left-hand corner of the tabletop, around the driving pulley 61 of a "Y" servomotor 63, around the driving pulley 65 of a "Y" encoder 67, around a fixed pulley 69 mounted near the lower left-hand corner of the tabletop, around pulley 71 mounted at the outward end of arm 31; around pulley 73 mounted on the slider 41; around a second pulley 75 mounted at the outward end of arm 31, and thus to the anchored end 51B.

FIG. 7 shows how the arm 31 can be moved to and fro along the length of the rod 25. An endless stranded steel cable 81 extends from an anchor point 83 on the "inward" end of the arm 31 along the top of the edge of the frame 15 to a pulley 85 fixedly mounted on that frame, and then back past the arm 31 to a second pulley 87 mounted on the frame, thence around the pulley 89 of an "X" encoder 91 and the driving pulley 93 of an "X" servomotor 95, and a further fixed pulley 97, to a fixed pulley 99 at the far end of the frame 15, being fixed to an anchor point 101 at the free end of the arm 31. The cable 81 then extends back to a fixed pulley 103 which actually is mounted freely on the same spindle as the pulley 97, and thence extending around a pulley 105 (on the same spindle as the pulley 87) back to the anchor point 83.

Both of the cables 51 and 81 are prestressed, for example to a tension of 10 pounds, so that they are driven positively by the associated motors and in turn drive positively the associated encoders. These encoders are of the well-known optical pulse type.

Mounted on the top of the slider 41 is a radiation source 111 (see FIGS. 4 and 9) including two pairs of air-cored coils 113 and 115 arranged with their axes at right angles to one another and mounted by suitable adhesive on an aluminum disc 117. This plate is secured to the slider with such an orientation that the two coils are suitably oriented with reference to the edges of tabletop. Merely by way of example, the inductance of the pair of coils 113, and that of the pair of coils 115, is 500 mh.

With reference now to FIG. 8, there is shown the operation of the servosystem which includes the two servomotors 63 and 95. The radiation source 111 is energized, for example, by a 3 kc. per second oscillator 121 which energizes the "X" coil 113 directly but which energizes the "Y" coil 115 through an amplifier 123 which introduces a phase shift of 90°, corresponding to the physical difference in orientation of the two coils. This oscillator provides a sine wave output, and this waveform is preserved in the flux produced by the two coils. The manually movable index 7 includes a circular glass window provided with cross wires to define an exact "reading" or tracing point. Again, merely by way of example, the index 7 is of 2-inches diameter and is wound with 200 turns of a pickup coil 125 having an inductance of 500 mh. This coil is connected to the input terminals of a tuned preamplifier 127, having a 20 percent pass band, which eliminates any unwanted signals picked up by the coil 125. The connecting lead 9 is suitably screened, and the output from the preamplifier is applied both to an "X" synchronous detector 129 and to "Y" synchronous detector 131. Also applied to these detectors are reference signals from the input and from the output of the phase-shifting amplifier 123.

The two synchronous detectors thus provide signals respectively indicative of the "X" and "Y" components of the signal picked up by the coil 125. These two outputs are applied respectively to servoamplifiers 133 and 135 together with the outputs respectively of the "X" encoder 91 and the "Y" encoder 67. The action of the servoloop described is to ascertain any error in positioning of the index 7 relative to the radiation source 111, and drive the servomotor 63 and/or the servomotor 95 to reduce that error to zero.

In use of the apparatus described above, the operator moves the index 7 along the line to be traced, the servomotors described above moving the slider 41 along the arm 31 and the arm 31 along the rod 25 to keep the radiation source 111 immediately below the cross wires of the index. At appropriate times, the operator actuates the foot switch 13 and the outputs from the encoders 91 and 67 are applied through terminals 141 to a suitable recording medium, a magnetic tape in the example illustrated.

It has been found that the apparatus described can provide a high degree of accuracy in the readout of the coordinates of a point on, say, a map, and yet the apparatus is relatively simple and cheap. The frequency of the radiation used suitably can be 3 to 9 kc. per second.

Obviously many modifications and variations of the present invention are possible in light of the above teachings. It is therefore to be understood that within the scope of the appended claim the invention may be practiced otherwise than as specifically described.

I claim:

1. Apparatus for providing the X- and Y-coordinates of selected points along a manually traced line, relative to a preselected origin and axis of reference, comprising:

a planar table providing a support for a map or drawing the lines of which are to be traced;

a source of electromagnetic radiation located below the said planar table, but in close proximity to that table including a first X-axis source, and a second Y-axis source;

means for supplying a first electrical signal to said X-axis source;

means for supplying a second electrical signal to said Y-axis source;

a manually movable index disposed above the table;

radiation-detecting means affixed to the movable index and effective to receive radiation through the table from the radiation source and produce an error signal having a first component derived from said first signal and a second component derived from said second signal;

mounting means below the table carrying said source of radiation and permitting movement of that source below a limited area of the table;

servo means connected to said radiation source for receiving said error signal from said radiation-detecting means and for repositioning said mounting means to correct any deviation of said radiation source from a position immediately opposite said radiation-detecting means including means for detecting said first component and causing said radiation source to move along a predetermined X-axis in accordance with said first component and means for detecting said second component and causing said radiation source to move along a predetermined Y-axis, normal to said X-axis, in accordance with said second component;

"X" axis encoding means operated by the servo means and providing an indication of any change in position of the source along said predetermined "X" axis on the table;

"Y" axis encoding means operated by the servo means and providing an indication of any change in position of the source along said predetermined "Y" axis on the table, normal to the said "X" axis; and operator actuated readout means providing when actuated an output indicative of "X" and "Y" coordinates ascertained by the two encoding means.

2. Apparatus as in claim 1, wherein the radiation used has a frequency lying in the range 3 to 9 kc. per second.

3. Apparatus as in claim 1, wherein the radiation used has frequency close to 9 kc., per second.

4. Apparatus as in claim 1, and in which the mounting means comprise:

a guide member extending parallel to one edge of the planar table;

an arm slidably carried by the guide member and extending away from the guide member at 90°;

a slider carried by the arm and movable along that arm;

the radiation source being mounted on and movable with the said slider.

5. Apparatus as in claim 1, and in which the manually movable index is in the form of a window provided with cross wires or the equivalent, and the radiation detecting means consist of a multiturn coil mounted on and encircling the said window.

6. Apparatus as in claim 1, and in which a tuned preamplifier is connected between the radiation detecting means and the servo means to eliminate at least to a large extent unwanted signals.

7. Apparatus as in claim 1, and in which the radiation source comprises two coil means disposed with their axes respectively at right angles to one another.

8. Apparatus as in claim 1, and in which the servo means include a first cable arranged over pulleys and arranged to move the radiation source in a direction parallel to a "Y" axis and a second cable arranged over pulleys and arranged to move the radiation source in a direction parallel to a "X" axis which is at right angles to the said "Y" axis.

9. Coordinate providing means according to claim 1, and in which each encoding means is an optical pulse encoder.

10. Apparatus for providing the X- and Y-coordinates of selected points along a manually traced line, relative to a preselected origin and axis of reference, comprising:

a planar table providing a support for a map or drawing the lines of which are to be traced;

a source of radiation located below the said planar table, but in close proximity to that table including a first X-axis source and a second Y-axis source;

means for supplying a first electrical signal to said X-axis source;

means for supplying a second electrical signal to said Y-axis source;

a manually movable index disposed above the table;

radiation-detecting means affixed to the movable index and effective to receive radiation through the table from the radiation source and produce an error signal having a first component derived from said first signal and a second component derived from said second signal;

mounting means below the table carrying the source of radiation and permitting movement of that source below a limited area of the table; and servo means connected to said radiation source to receive said error signal from the radiation-detecting means and to reposition the mounting means to correct any deviation of said source from a position immediately opposite the radiation-detecting means, including means for detecting said first component and causing said radiation source to move along a predetermined X-axis in accordance with said first component and means for detecting said second component and causing said radiation source to move along a predetermined Y-axis, normal to said X-axis, in accordance with said second component.

* * * * *